United States Patent [19]
Persyn

[11] 4,230,333
[45] Oct. 28, 1980

[54] TOW STABILIZER

[76] Inventor: Roland Persyn, Le Hameau des Muriers, Carbon Blanc, France, 33560

[21] Appl. No.: 839,935

[22] Filed: Oct. 6, 1977

[30] Foreign Application Priority Data

Oct. 12, 1976 [FR] France .................................. 76 31313
Apr. 6, 1977 [FR] France .................................. 77 12110

[51] Int. Cl.² ............................................. B60D 1/06
[52] U.S. Cl. ............................................... 280/406 A
[58] Field of Search .......... 280/405 R, 405 A, 406 A, 280/407, 446 R

[56] References Cited
U.S. PATENT DOCUMENTS

| | | | |
|---|---|---|---|
| 3,414,295 | 12/1968 | Rendessy | 280/446 R |
| 3,542,395 | 11/1970 | Millikan | 280/406 A |
| 3,600,004 | 8/1971 | Newkirk | 280/406 A |
| 3,814,463 | 6/1974 | Tunesi | 280/406 A |

FOREIGN PATENT DOCUMENTS 1415837  9/1965  France ................................. 280/406 A Primary Examiner—John A. Pekar
Attorney, Agent, or Firm—J. Harold Nissen

[57] ABSTRACT

A tow stabilizer device intended to distribute part of the load at the end of a tow frame on a level with the swivel joint of the coupling to the front and rear wheels of the towing vehicle and to the wheels of the tow frame while eliminating the swaying and rolling effects. The stabilizer includes a leaf spring or spring leaf at one end thereof articulated on a jaw and kept articulated in a vertical line with the support axis of the coupling's swivel joint. The jaw is braked in its lateral displacements by means of friction disks. The other end of the spring is connected by a screw jack to a crosspiece which is attached to the arms of the tow frame by flexible connections. Each of the flexible connections rest on a hinged bracket which is positioned on arms permitting the swerving of the assembly of the crosspiece and the spring leaf.

11 Claims, 10 Drawing Figures

TOW STABILIZER

BACKGROUND OF THE INVENTION

1. Field of the Invention

This invention relates to a stabilizing device for a tow frame. More particularly, the invention is concerned with a new stabilizing device for a tow frame which is intended to distribute part of the load at the end of the tow frame at the level of the swivel joint of the coupling to the front and rear wheels of the towing vehicle and to the wheels of the tow frame. This load distribution is to eliminate swaying and rolling effects and also improves and rationalizes the braking.

2. Descritpion of the Prior Art

There are known different load-distributing stabilizing devices, anti-swaying devices, and devices combining both effects.

The load-distributing devices consist of either one or two leaf springs or single-leaf springs articulated laterally at one end in a vertical line with the swivel joint of the coupling for a single-spring stabilizer. For a swivel joint coupling, two springs are used, one on each side of the swivel joint of the coupling. The other end of the spring is connected by means of a chain or chains or screw jack or jacks to one of the arms forming the shaft in the case of a single spring. And, the other ends of the two springs are coupled to each of the arms of the shaft, in the case of the two-spring distributor, with the chain(s) or screw jack(s) being intended to produce the tension of the spring or springs required according to the weight at the end of the tow frame in order to distribute the force at the end of the shaft over the wheels of the towing vehicle and the wheels of the tow frame. According to another embodiment, and when a single spring is used, one end of the spring is articulated in the axis of the swivel joint and the other end of the spring is connected by a chain or screw jack to a crosspiece connecting the two arms forming the shaft.

With regard to anti-swaying devices, these devices consist of one or two leaves braked on their axis of lateral articulation at the level of the coupling to the towing vehicle by means of friction disks. These friction disks offer resistance when the leaf or leaves are acted on when the towing vehicle changes its direction of towing or when the tow frame is subjected to lateral displacements as a result of the state of the roadway or due to wind gusts.

The known devices which act as both load distributors and anti-swaying devices are made as described for the load distributors alone, with the spring leaves being braked by friction disks at the level of the articulations in a vertical line with the coupling. In none of these known devices is it possible to control at will the hardness of the spring or springs in accordance with the load at the end of the tow frame in a rational manner. Therefore, these devices can be used only for tow shafts with a load at the end of the shaft which is within a certain range. Furthermore, none of these known devices is provided with a shock absorber, and the failure to use shock absorbers causes retransmission of shocks as well as the deformation and deterioration of the accessory or principal parts, such as the support elements of the chains or screw jacks or frame of the tow.

With regard to the prior known anti-swaying or rolling devices, none of these is capable of producing a counter-direction on a level with the tow during an abrupt change of direction or in a turn. All of these anti-swaying and rolling devices have the drawback of extending the threshold of possible danger without, however, claiming to eliminate the forces tending toward a veering of the towed tow.

It is therefore an object of the invention to provide a tow stabilizer in which the hardness of the spring is controlled in accordance with the load at the end of the tow shaft.

Another object of the invention is to provide a tow stabilizer with shock absorption capabilities.

A further object of the invention is to provide a tow stabilizer which is capable of producing a counter-direction on a level with the tow while the towing vehicle is making an abrupt change of direction.

SUMMARY OF THE INVENTION

The invention is concerned with a stabilizer for a tow frame comprising a spring element consisting of a spring leaf or leaf spring. One end of the spring is maintained in a verticle line with the swivel joint of the coupling by a clamp or support plate. The clamp or support plate is movable laterally about an axis defined by an axle extending from the swivel joint, or integral with a coupling fitting and meeting with a shaft integral with the support plate of the swivel joint. The clamp or support plate is equipped with friction members intended to offer resistance to the lateral displacements to which the spring element is subjected during gusts of wind, changes in direction, or deformation of the roadway. The spring element on the clamp or support plate is turnable vertically and is held in a defined position in order to change the hardness of the spring element in accordance with the load to be distributed when this is held at its other end by a rigid mechanical member, such as a screw jack or any other known tension member. The screw jack or other tension member is held or fixed at the center of a crosspiece which connects the arms forming the tow frame in order to distribute the force produced equally to each arm and also to produce a counter-directional force opposed to the vertical, horizontal, or transverse forces or actions. The crosspiece is connected to the frame arms by flexible connections intended to absorb and eliminate shocks and to easily distribute the forces present. The connection between the crosspiece and the frame arms facilitates the sliding of the inertial coupling head connected to the frame and rationalizes and improves the braking. The crosspiece and the flexible connections are connected to the frame arms by turnable movable brackets which make it possible to position the spring element along an axis different from the axis of the tow frame, in order to avoid any interference with the members forming part of the tow frame.

Other objects, advantages and the nature of the invention will become clearer and readily apparent from the detailed description of the preferred embodiments of the invention, as described with reference to the accompanying drawings.

DESCRIPTION OF THE PREFERRED EMBODIMENTS

Figure 1:
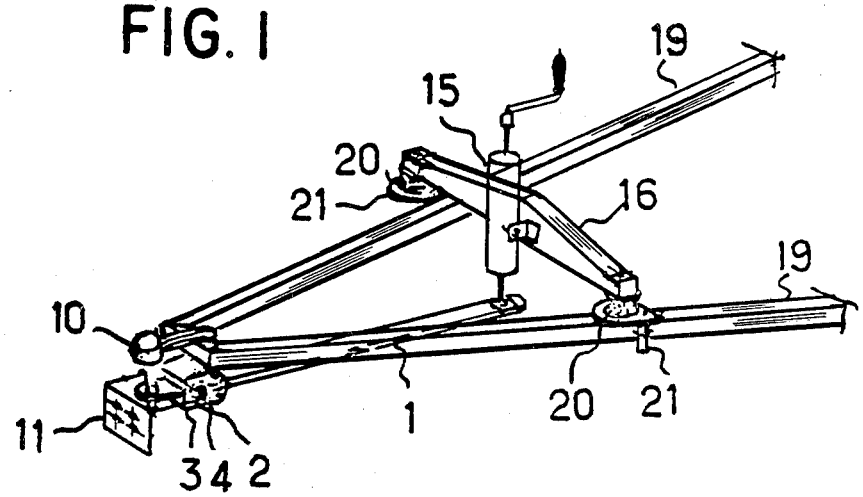
FIG. 1 is a perspective view of one embodiment of the stabilizer according to the invention.
Figure 2:
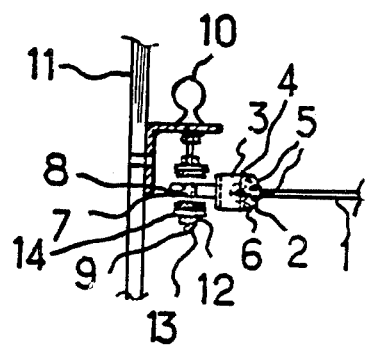
FIG. 2 is a detail view of a connection between the spring element and the coupling of the vehicle.
Figure 3:
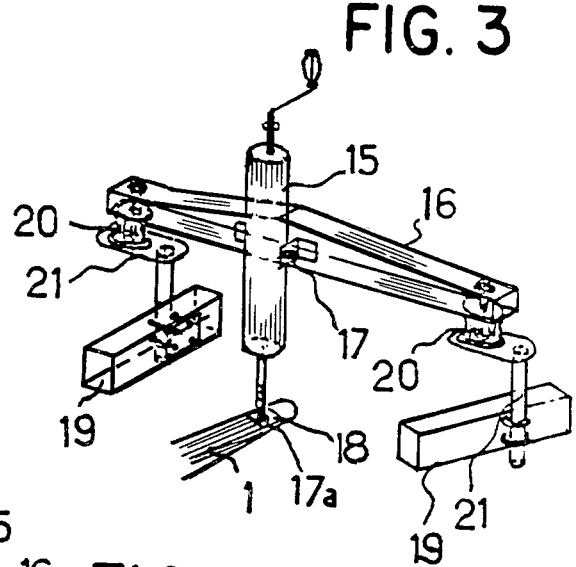
FIG. 3 is a detail view showing one manner of fastening the crosspiece to the shaft arms.

Referring to the drawings in which the same reference numeral designates the same elements throughout, FIGS. 1, 2, and 3 show the stabilizer which includes a spring element consisting of a spring leaf 1 or a leaf spring, one end of which is held articulated vertically between the parallel jaws 2 of a clamp 3 by an axle defining an axis 4 which is substantially parallel to the roadway. The spring 1 is turnable at will in a vertical plane of the clamp relative to the roadway about axle 4, and it is held in position by means of two pins 5 between which it is inserted. The pins 5 pass through apertures 6 provided for this purpose. The apertures 6 are distributed over an arc of a circle whose center is the center of axis 4, with the apertures 6 being present in a sufficient number to permit different orientations to provide the required hardness control to control the hardness of the spring in accordance with the load at the end of the shaft to be distributed. The orientation and support of the spring in a definite postion is obtainable by means of known devices such as a toothed bar, braked axis, or adjustable stop (not shown). A horizontal strap 7 extends from clamp 3 and is provided with a central aperture 8 which is intended to receive a cylindrical axle defining an axis 9 which vertically extends the support axis of the swivel joint 10 of the coupling; said axis 9 is integral with the axis of a swivel joint 10 or is independent and is supported on one or two attached plates (not shown) integral with a plate 11 extending from the attachment sliders of the towing vehicle. The side faces of the horizontal strap 7 are in contact with friction disks 12 which are intended to brake the lateral displacement of the clamp 3 by means of the constant support of the disks 12 produced by the tightening of a screw-nut combination 13 acting on a compression spring 14, for example, and already known.

The other end of the spring 1 is connected by means of a rigid tension member in the form of a screw jack 15 supported on a crosspiece 16. The jack 15 is used for the purpose of stretching the spring 1 in accordance with the load to be distributed. The jack 15 is supported directly at the center of the crosspiece 16 by means of a double strap 17 which permits a lateral rotation of the jack with respect to the axis of the tow frame. And, in particular, if the coupling hook at the end of the frame is provided with a shock absorber, the end of the screw is connected to the spring by means of a spherical swivel joint 17a, housed in bearing 18 integral with the spring 1. Arms 19 are positioned on opposite sides of the spring 1 and connected together at one end and operatively connected with the swivel joint 10. The arms extend in a plane substantially parallel to the roadway and diverge from the swivel joint. According to the other embodiments not shown, the end of the screw is connected to the spring 1 by a flexible connection made of a material such as an elastomer or by means of a double strap or a hook and ring.

The crosspiece 16 is attached to arms 19 of the frame by flexible connections 20. The flexible connections are made of elastomeric material or of any other similar material to serve as a shock absorber. These flexible connections can be replaced by compressible metal springs or pneumatic springs in order to absorb microvibrations and to make the counter-directional effect produced functional and to preserve the mechanical element of the towing vehicle, of the coupling and frame of the tow frame, with the flexible connections 20 each resting on a hinged joint 21. The hinged joint 21 is turnable on the arms 19 to permit the swerving of the crosspiece-jack assembly, and, thereby, the orientation of the spring 1 along an axis which may be different from the lateral axis of the tow and, in this way, avoid the different members integral with the tow frame such as brake cables, etc., in order that the force sustained by the crosspiece may be distributed in a constant manner over the arms 19 of the shaft.

According to another embodiment not shown, the flexible connections 20 may rest directly on the arms 19 of the frame; the axis of alignment of the spring thereby becomes an extension of the lateral axis of the tow frame.

Figure 4:
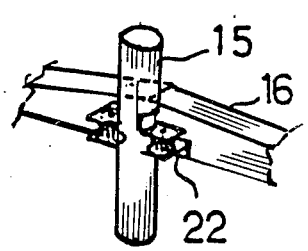
FIG. 4 is a view illustrating a modification of the manner of fastening shown in FIG. 3 and specifically the attachment of the tension member to the crosspiece connecting the shaft arms.

As shown in FIG. 4, the screw jack 15 is connected to the crosspiece 16 by flexible connections 22 made of material such as an elastomer or any other similar material or by metal compression springs so as to increase the shock-absorbing effect in order to eliminate the shocks transmitted to the towing vehicle. In this embodiment, the crosspiece 16 is connected to the brackets 21 either directly or by means of flexible connections 20.

The position of the tension member at the center of the crosspiece 16 also has the effect of transmitting to the corresponding arms 19 of the frame a counter-directional effect. This counter-directional effect particularly acts on the arm of the frame placed on the side of the smaller radius in the case of a turn, and thus increases the adhesion of the tow frame while limiting the rolling of the tow frame during the turn.

Figure 5:
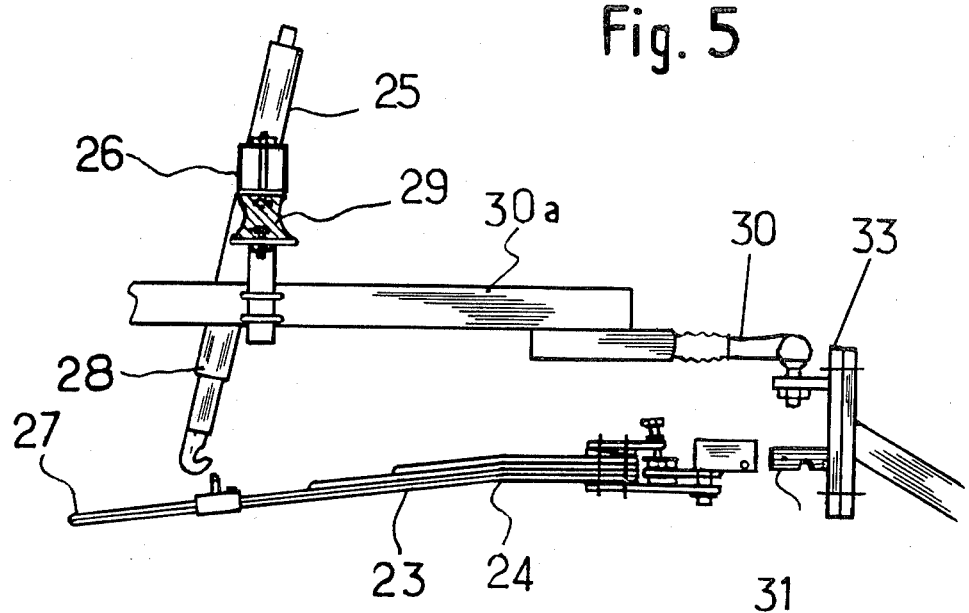
FIG. 5 is a modification of the stabilizer of FIG. 1, with the spring element disconnected and not under tension.
Figure 6:
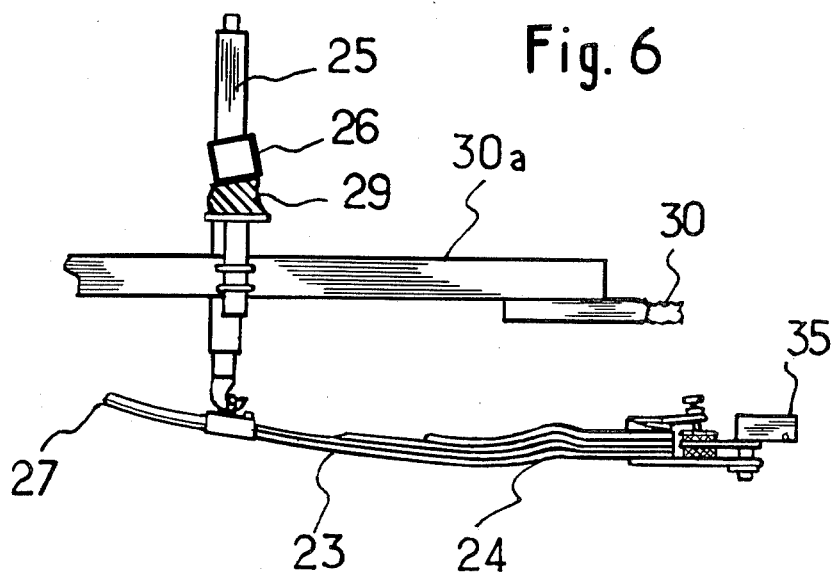
FIG. 6 shows the spring element of FIG. 5 connected and under tension.
Figure 7:
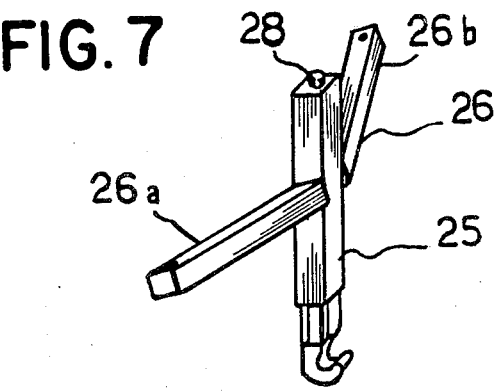
FIG. 7 is a detail showing of a tension device, tension member and crosspiece assembled together, of FIG. 5.

In the modification shown in FIGS. 5, 6, and 7, spring element 23 shows a deviation which causes a point of inflection 24 under a load located in a vertical line with the attachment of inertial mobile head 30 to the shaft 30a of the tow frame, so that the balance of loads takes place all along the head 30, and in this way facilitates sliding of the head 30 during braking. The rigid tension member 25 and the crosspiece 26, which are integral with each other to form a swing-bar, are assembled so that the crosspieces 26a and 26b show an inclination toward the free end 27 of the element 23. And, after attachment as shown in FIG. 6, and tensioning of the spring element 23 by means of an endless screw 28, the tension member 25 is positioned vertically and causes the compression and deformation of the flexible connections 29. This deformation has the purpose of producing an overcompression with respect to the free end 27 of the spring element 23 which is intended to facilitate sliding of the mobile head 30. The sliding is also promoted by the spring element 23 which, once under load, constantly acts as a position corrector, applying to the connections 29 a load tending to return these to a natural position. Furthermore, the inclination in the horizontal plane has the object of overcoming the vertical component produced during the load distribution of the spring element 23. On the part of the flexible connections and their effect, the equilibrium or return to equilibrium of the stabilizing device always takes place with ease, thus eliminating shocks.

Figure 10:
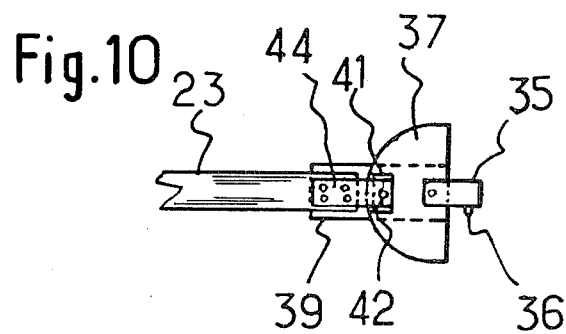
FIG. 10 is another view of the stabilizer hardness control shown in FIG. 5.
Figure 8:
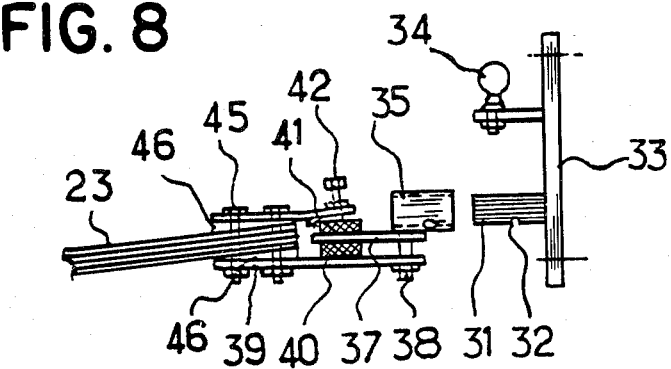
FIG. 8 is a view illustrating a locking device for bolting the tow frame device to the vehicle coupling and illustrating a modification of the stabilizer hardness control.
Figure 9:
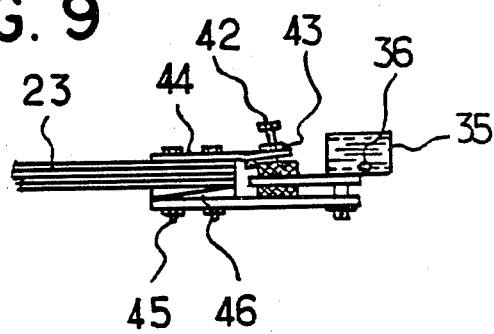
FIG. 9 is a view similar to the view of FIG. 8, but omitting the vehicle coupling and illustrating a modification of the stabilizer hardness control shown in FIG. 5.

According to FIGS. 8, 9 and 10, the locking device includes a channeled shaft 31 provided with a transverse groove 32 integral with the support plate 33 of the swivel joint 34. Channeled coupling 35 fits on the channeled shaft 31 and is equipped with a movable key 36 (FIG. 9) of the same cross-section as the groove, with an automatic return by a spring (not shown), which is intended, when this is moved, to release the total section of the coupling 35 by means of an aperture provided on this, so that the stabilizing device can be assembled on the channeled shaft 31. The coupling 35 is immobilized by means of the movable key 36 which is inserted into the transverse groove 32 provided on the channeled shaft.

A disk plate 37 is attached to the channeled coupling 35 and is equipped with an axle defining an axis 38 on which a support plate 39 is articulated to support the spring element 23. A lower brake disk 40 is attached to plate 39 by glue or by any other known means of assembly. One face of lower brake disk 40 is supported on the disk plate 37. Symmetrically with the brake plate or disk 40, is another brake plate or disk 41 which is supported on the other face of the disk plate 37. This brake plate 41 is maintained by means of a bolt 42 equipped with a lock-nut 43. Nut-bolt combination 42-43 is intended to maintain or control the pressure of the brake plates 40 and 41 on the disk plate 37. The bolt 42 is integral with a spring back plate 44 and is maintained in the upper part of the spring element 23 by assembly members 45 so as to integrate and immobilize the back plate 44 and the spring element 23 against the plate 39.

In order to obtain different controls, particularly in accordance with the type of tow frame, and in accordance with the tension of the spring element 23 that it is necessary to have for an optimum functioning of the stabilizer, the spring element 23 is turnable with respect to the plate 39 by means of two slanting wedges 46 inserted between the spring element 23 and the plate 39 (FIG. 9), or between the spring element 23 and the back plate 44, or each between the plate 39 and back plate 44 (FIG. 8), with the positioning of the wedges 46 always being carried out, regardless of the possible combinations, in such a way that the support of the back plate 44 on the spring element 23 is parallel to the plate 39.

According to another embodiment not shown, the channeled coupling 35 can be placed vertically. The disk plate 37 is attached to the coupling 35 while the plate 39 is articulated. The channeled shaft 31 also is placed vertically either integral with the plate receiving the swivel joint of the coupling or with an attached plate fixed to the plate 33 of the coupling.

While there has been shown that what is considered to be the preferred embodiments of the invention, various changes and modifications may be made therein without departing from the scope of the invention.

I claim:

1. A tow stabilizer for a tow frame for coupling to a towing vehicle, said vehicle having a coupling attached thereto for connection with said tow frame, comprising:
    spring means including first and second ends, said spring means extending along a substantially horizontal axis of the tow frame relative to the vehicle roadway;
    clamping means including means for connection to said towing vehicle, said clamping means including an axle having an axis which is substantially parallel to the roadway, and extending in a direction transversely to the horizontal axis of said tow frame, said clamping means including locking pins and apertures for receiving said locking pins;
    said first end including means pivotally connecting said spring means with said axle for movement in a vertical plane relative to said clamping means, said spring means being positioned between said locking pins, and said locking pins controlling the amount of movement of said spring means in the vertical plane;
    said clamping means being pivotally mounted about a vertical axis and including friction means, said friction means braking the pivotal displacements of said clamping means;
    a pair of arms connected together at one end thereof and with said coupling, the other end of said arms extending in a plane substantially parallel to the roadway and diverging from said coupling;
    a crosspiece, flexible connections connecting said crosspiece with the other end of said arms; and
    a rigid tension member connected with the center of said crosspiece and second end of said spring means and connecting said spring means with said arms by means of said flexible connections with said arms forming said tow frame to distribute the tensile stress produced over each of said shaft arms.

2. The tow stabilizer according to claim 1, including:
    a horizontally slidable inertial mobile head connected with said coupling,
    said spring means including a spring element connected operatively with said mobile head and having a deviation in its horizontal level in order to produce a point of inflection during load distribution in a vertical line.

3. A tow stabilizer according to claim 1, including an elastic connection, said tension member being connected to said spring by means of said elastic connection, said elastic connection including an articulated swivel joint.

4. A tow stabilizer according to claim 1, including two elastic connections, said tension member being connected to said crosspiece by said two elastic connections, permitting it a lateral displacement with respect to a lateral axis of the tow frame.

5. A tow stabilizer according to claim 1, wherein said crosspiece includes arms joined to the tension member at an inclination in both the vertical plane and horizontal plane to form a swing-bar.

6. A tow stabilizer according to claim 5, including a horizontally slidable inertial head connected with said coupling, and wherein said spring means includes a free end extending from said second end, and said swing-bar includes a flexible connection, and said tension member causing, during load distribution, a compression and deformation of said flexible connection, thereby producing an overcompression to said free and of said spring means.

7. The tow stabilizer according to claim 1, including turnable brackets integral with said shaft arms, said flexible connections, connecting said crosspiece with the arms of said shaft.

8. The tow stabilizer according to claim 1, wherein said spring means is movable into alignment with a lateral axis of said tow frame or along a different axis to avoid the other members of said tow frame.

9. A tow stabilizer according to claim 1, including:
strap and friction members assembled on an axle extending from a swivel joint of said coupling, said strap having a central aperture for receiving said axle, said friction members preventing pivotal displacement of said clamping means,
a screw-nut assembly maintaining said strap and friction members on said axle,
a channeled shaft coupled with said towing vehicle, said channeled shaft having a transverse groove, for immobilizing said channeled coupling.

10. A tow stabilizer according to claim 1, including:
a disk plate attached to said channeled shaft,
an axle fixed to said disk plate, said other end of said spring means including a support plate articulated to said axle to support said spring means,
a disk plate extending from said channeled shaft,
a lower brake disk attached to said support plate and to one face of said disk plate,
an upper brake disk supported on the other face of said disk plate,
a back plate connected with said spring means, and
a bolt-lock nut combination connected with said back plate to hold said upper brake disk integral with said back plate.

11. A tow stabilizer for a tow frame for coupling to a towing vehicle, said vehicle having a coupling attached thereto for connection with said tow frame, comprising:
spring means including first and second ends, said spring means extending along a substantially horizontal axis of the tow frame relative to the vehicle roadway, said spring means including a spring element oriented to a defined vertical position
clamping means for connection of said spring means to said towing vehicle, said clamping means including engageable means operatively associated with said coupling;
said first end including means pivotally connecting said spring means with said clamping means in a vertical plane relative to said defined vertical position;
said clamping means including wedges which immobilize said spring element in said defined vertical position;
a pair of arms connected together at one end thereof and with said coupling, the other end of said arms extending in a plane substantially parallel to the roadway and diverging from said coupling;
a crosspiece, flexible connections connecting said crosspiece with the other end of said arms; and,
a rigid tension member connected with the center of said crosspiece and said second end of said spring means and connecting said spring means with said arms by means of said flexible connections with said arms forming said tow frame to distribute the tensile stress produced over each of said shaft arms.

* * * * *